(12) United States Patent
Reed

(10) Patent No.: US 11,234,304 B2
(45) Date of Patent: Jan. 25, 2022

(54) PHOTOCONTROLLER TO CONTROL OPERATION OF A LUMINAIRE HAVING A DIMMING LINE

(71) Applicant: Express Imaging Systems, LLC, Renton, WA (US)

(72) Inventor: William G. Reed, Seattle, WA (US)

(73) Assignee: Express Imaging Systems, LLC, Renton, WA (US)

( * ) Notice: Subject to any disclaimer, the term of this patent is extended or adjusted under 35 U.S.C. 154(b) by 0 days.

(21) Appl. No.: 16/842,924

(22) Filed: Apr. 8, 2020

(65) Prior Publication Data

US 2020/0375000 A1 Nov. 26, 2020

Related U.S. Application Data

(60) Provisional application No. 62/852,727, filed on May 24, 2019.

(51) Int. Cl.
*H05B 45/12* (2020.01)
*H05B 45/34* (2020.01)
*H05B 47/11* (2020.01)

(52) U.S. Cl.
CPC ............. *H05B 45/34* (2020.01); *H05B 45/12* (2020.01); *H05B 47/11* (2020.01)

(58) Field of Classification Search
CPC ...... G01J 1/0407; G01J 1/0403; G01J 1/0271; G08C 19/00; F21V 23/0464;
(Continued)

(56) References Cited

U.S. PATENT DOCUMENTS

| 2,745,055 A | 5/1956 | Woerdemann |
| 4,153,927 A | 5/1979 | Owens |

(Continued)

FOREIGN PATENT DOCUMENTS

| CN | 103162187 A | 6/2013 |
| DE | 4001980 A1 | 8/1990 |

(Continued)

OTHER PUBLICATIONS

Office Action for U.S. Appl. No. 16/408,875, dated May 19, 2020, 20 pages.

(Continued)

*Primary Examiner* — Henry Luong
(74) *Attorney, Agent, or Firm* — Cozen O'Connor

(57) ABSTRACT

A photocontrol circuit includes a set of light level detection circuitry which is powered by a 0 to 10V dimming input. In response to a determination that light sensed in ambient environment is at or below the light level threshold, the light level detection circuitry switches a 0 to 10V dimming input line to approximately 10V, controlling a luminaire to emit maximum light. In response to a determination that light sensed in ambient environment is above the light level threshold, the light level detection circuitry switches the 0 to 10V dimming input line to less than approximately 1 Volt, thereby controlling the luminaire to emit minimum or no light. The photocontrols embodiments described herein advantageously employ the 0 to 10V dimming line as the luminaire control line, and photocontrol power source, unlike previous photocontrols which typically switch the power input to the luminaire. The photocontrol circuit may be housed in a photocontrol module comprising a base and a cover.

17 Claims, 4 Drawing Sheets

(58) Field of Classification Search
CPC ..... F21V 23/0442; F21V 15/01; H01R 24/38; H01R 33/945; H05B 47/10; F21W 2131/10
See application file for complete search history.

(56) References Cited

U.S. PATENT DOCUMENTS

| | | |
|---|---|---|
| 4,237,377 A | 12/1980 | Sansum |
| 4,663,521 A | 5/1987 | Maile |
| 5,086,379 A | 2/1992 | Denison et al. |
| 5,160,202 A | 11/1992 | Legare |
| 5,161,107 A | 11/1992 | Mayeaux et al. |
| 5,230,556 A | 7/1993 | Canty et al. |
| 5,276,385 A | 1/1994 | Itoh et al. |
| 5,343,121 A | 8/1994 | Terman et al. |
| 5,349,505 A | 9/1994 | Poppenheimer |
| 5,450,302 A | 9/1995 | Maase et al. |
| 5,508,589 A | 4/1996 | Archdekin |
| 5,561,351 A | 10/1996 | Vrionis et al. |
| 5,589,741 A | 12/1996 | Terman et al. |
| 5,619,127 A | 4/1997 | Warizaya |
| 5,808,294 A | 9/1998 | Neumann |
| 5,838,226 A | 11/1998 | Houggy et al. |
| 5,936,362 A | 8/1999 | Alt et al. |
| 6,111,739 A | 8/2000 | Wu et al. |
| 6,149,283 A | 11/2000 | Conway et al. |
| 6,160,353 A | 12/2000 | Mancuso |
| 6,377,191 B1 | 4/2002 | Takubo |
| 6,612,720 B1 | 9/2003 | Beadle |
| 6,674,060 B2 | 1/2004 | Antila |
| 6,681,195 B1 | 1/2004 | Poland et al. |
| 6,746,274 B1 | 6/2004 | Verfuerth |
| 6,753,842 B1 | 6/2004 | Williams et al. |
| 6,828,911 B2 | 12/2004 | Jones et al. |
| 6,841,947 B2 | 1/2005 | Berg-Johansen |
| 6,880,956 B2 | 4/2005 | Zhang |
| 6,902,292 B2 | 6/2005 | Lai |
| 6,985,827 B2 | 1/2006 | Williams et al. |
| 7,019,276 B2 | 3/2006 | Cloutier et al. |
| 7,066,622 B2 | 6/2006 | Alessio |
| 7,081,722 B1 | 7/2006 | Huynh et al. |
| 7,084,587 B2 | 8/2006 | Archdekin et al. |
| 7,122,976 B1 | 10/2006 | Smith et al. |
| 7,188,967 B2 | 3/2007 | Dalton et al. |
| 7,196,477 B2 | 3/2007 | Richmond |
| 7,218,056 B1 | 5/2007 | Harwood |
| 7,239,087 B2 | 7/2007 | Ball |
| 7,252,385 B2 | 8/2007 | Engle et al. |
| 7,258,464 B2 | 8/2007 | Morris et al. |
| 7,270,441 B2 | 9/2007 | Fiene |
| 7,281,820 B2 | 10/2007 | Bayat et al. |
| 7,314,291 B2 | 1/2008 | Tain et al. |
| 7,317,403 B2 | 1/2008 | Grootes et al. |
| 7,322,714 B2 | 1/2008 | Barnett et al. |
| 7,330,568 B2 | 2/2008 | Nagaoka et al. |
| 7,339,323 B2 | 3/2008 | Bucur |
| 7,339,471 B1 | 3/2008 | Chan et al. |
| 7,405,524 B2 | 7/2008 | Smith et al. |
| 7,438,440 B2 | 10/2008 | Dorogi |
| 7,440,280 B2 | 10/2008 | Shuy |
| 7,468,723 B1 | 12/2008 | Collins |
| 7,524,089 B2 | 4/2009 | Park |
| 7,538,499 B2 | 5/2009 | Ashdown |
| 7,547,113 B2 | 6/2009 | Lee |
| 7,559,674 B2 | 7/2009 | He et al. |
| 7,564,198 B2 | 7/2009 | Yamamoto et al. |
| 7,569,802 B1 | 8/2009 | Mullins |
| 7,578,596 B2 | 8/2009 | Martin |
| 7,578,597 B2 | 8/2009 | Hoover et al. |
| 7,623,042 B2 | 11/2009 | Huizenga |
| 7,627,372 B2 | 12/2009 | Vaisnys et al. |
| 7,631,324 B2 | 12/2009 | Buonasera et al. |
| 7,633,463 B2 | 12/2009 | Negru |
| 7,638,743 B2 | 12/2009 | Bartol et al. |
| 7,665,862 B2 | 2/2010 | Villard |
| 7,677,753 B1 | 3/2010 | Wills |
| 7,688,002 B2 | 3/2010 | Ashdown et al. |
| 7,688,222 B2 | 3/2010 | Peddie et al. |
| 7,697,925 B1 | 4/2010 | Wilson et al. |
| 7,703,951 B2 | 4/2010 | Piepgras et al. |
| 7,746,003 B2 | 6/2010 | Verfuerth et al. |
| D621,410 S | 8/2010 | Verfuerth et al. |
| D621,411 S | 8/2010 | Verfuerth et al. |
| 7,798,669 B2 | 9/2010 | Trojanowski et al. |
| 7,804,200 B2 | 9/2010 | Flaherty |
| 7,828,463 B1 | 11/2010 | Willis |
| 7,834,922 B2 | 11/2010 | Kurane |
| 7,932,535 B2 | 4/2011 | Mahalingam et al. |
| 7,940,191 B2 | 5/2011 | Hierzer |
| 7,952,609 B2 | 5/2011 | Simerly et al. |
| 7,960,919 B2 | 6/2011 | Furukawa |
| 7,983,817 B2 | 7/2011 | Breed |
| 7,985,005 B2 | 7/2011 | Alexander et al. |
| 8,100,552 B2 | 1/2012 | Spero |
| 8,118,456 B2 | 2/2012 | Reed et al. |
| 8,143,769 B2 | 3/2012 | Li |
| 8,174,212 B2 | 5/2012 | Tziony et al. |
| 8,183,797 B2 | 5/2012 | McKinney |
| 8,207,830 B2 | 6/2012 | Rutjes et al. |
| 8,260,575 B2 | 9/2012 | Walters et al. |
| 8,290,710 B2 | 10/2012 | Cleland et al. |
| 8,324,840 B2 | 12/2012 | Shteynberg et al. |
| 8,334,640 B2 | 12/2012 | Reed et al. |
| 8,344,665 B2 | 1/2013 | Verfuerth et al. |
| 8,376,583 B2 | 2/2013 | Wang et al. |
| 8,378,563 B2 | 2/2013 | Reed et al. |
| 8,390,475 B2 | 3/2013 | Feroldi |
| 8,427,076 B2 | 4/2013 | Bourquin et al. |
| 8,436,556 B2 | 5/2013 | Eisele et al. |
| 8,445,826 B2 | 5/2013 | Verfuerth |
| 8,450,670 B2 | 5/2013 | Verfuerth et al. |
| 8,457,793 B2 | 6/2013 | Golding et al. |
| 8,476,565 B2 | 7/2013 | Verfuerth |
| 8,508,137 B2 | 8/2013 | Reed |
| 8,541,950 B2 | 9/2013 | Reed |
| 8,547,022 B2 | 10/2013 | Summerford et al. |
| 8,586,902 B2 | 11/2013 | Verfuerth |
| 8,604,701 B2 | 12/2013 | Verfuerth et al. |
| 8,610,358 B2 | 12/2013 | Reed |
| 8,629,621 B2 | 1/2014 | Reed |
| 8,674,608 B2 | 3/2014 | Holland et al. |
| 8,749,403 B2 | 6/2014 | King et al. |
| 8,749,635 B2 | 6/2014 | Hogasten et al. |
| 8,764,237 B2 | 7/2014 | Wang et al. |
| 8,779,340 B2 | 7/2014 | Verfuerth et al. |
| 8,810,138 B2 | 8/2014 | Reed |
| 8,866,582 B2 | 10/2014 | Verfuerth et al. |
| 8,872,964 B2 | 10/2014 | Reed et al. |
| 8,878,440 B2 | 11/2014 | Reed |
| 8,884,203 B2 | 11/2014 | Verfuerth et al. |
| 8,896,215 B2 | 11/2014 | Reed et al. |
| 8,901,825 B2 | 12/2014 | Reed |
| 8,921,751 B2 | 12/2014 | Verfuerth |
| 8,922,124 B2 | 12/2014 | Reed et al. |
| 8,926,138 B2 | 1/2015 | Reed et al. |
| 8,926,139 B2 | 1/2015 | Reed et al. |
| 8,975,827 B2 | 3/2015 | Chobot et al. |
| 8,987,992 B2 | 3/2015 | Reed |
| 8,988,005 B2 | 3/2015 | Jungwirth et al. |
| 9,002,522 B2 | 4/2015 | Mohan et al. |
| 9,024,545 B2 | 5/2015 | Bloch et al. |
| 9,107,026 B1 | 8/2015 | Viswanadham et al. |
| 9,119,270 B2 | 8/2015 | Chen et al. |
| 9,131,552 B2 | 9/2015 | Reed et al. |
| 9,204,523 B2 | 12/2015 | Reed et al. |
| 9,210,751 B2 | 12/2015 | Reed |
| 9,210,759 B2 | 12/2015 | Reed |
| 9,288,873 B2 | 3/2016 | Reed |
| 9,301,365 B2 | 3/2016 | Reed |
| 9,312,451 B2 | 4/2016 | Reed et al. |
| 9,357,618 B2 | 5/2016 | Pandharipande et al. |
| 9,414,449 B2 | 8/2016 | Reed |
| 9,433,062 B2 | 8/2016 | Reed |
| 9,445,485 B2 | 9/2016 | Reed |

(56) References Cited

U.S. PATENT DOCUMENTS

| | | |
|---|---|---|
| 9,466,443 B2 | 10/2016 | Reed |
| 9,497,393 B2 | 11/2016 | Reed et al. |
| 9,538,612 B1 | 1/2017 | Reed |
| 9,572,230 B2 | 2/2017 | Reed |
| 9,693,433 B2 | 6/2017 | Reed et al. |
| 9,713,228 B2 | 7/2017 | Reed |
| 9,801,248 B2 | 10/2017 | Reed et al. |
| 9,924,582 B2 | 3/2018 | Vendetti et al. |
| 9,930,758 B2 | 3/2018 | Jayawardena et al. |
| 9,967,933 B2 | 5/2018 | Reed |
| 10,009,983 B2 | 6/2018 | Noesner |
| 10,068,468 B2 | 9/2018 | John et al. |
| 10,098,212 B2 | 10/2018 | Vendetti et al. |
| 10,219,360 B2 | 2/2019 | Vendetti et al. |
| 10,390,414 B2 | 8/2019 | Vendetti et al. |
| 10,433,382 B2 | 10/2019 | Kottritsch et al. |
| 2002/0113192 A1 | 8/2002 | La |
| 2003/0016143 A1 | 1/2003 | Ghazarian |
| 2003/0184672 A1 | 10/2003 | Wu et al. |
| 2004/0095772 A1 | 5/2004 | Hoover et al. |
| 2004/0105264 A1 | 6/2004 | Spero |
| 2004/0120148 A1 | 6/2004 | Morris et al. |
| 2004/0192227 A1 | 9/2004 | Beach et al. |
| 2004/0201992 A1 | 10/2004 | Dalton et al. |
| 2005/0099802 A1 | 5/2005 | Lai |
| 2005/0135101 A1 | 6/2005 | Richmond |
| 2005/0174780 A1 | 8/2005 | Park |
| 2005/0231133 A1 | 10/2005 | Lys |
| 2005/0243022 A1 | 11/2005 | Negru |
| 2005/0254013 A1 | 11/2005 | Engle et al. |
| 2006/0001384 A1 | 1/2006 | Tain et al. |
| 2006/0014118 A1 | 1/2006 | Utama |
| 2006/0034075 A1 | 2/2006 | Alessio |
| 2006/0053459 A1 | 3/2006 | Simerly et al. |
| 2006/0066264 A1 | 3/2006 | Ishigaki et al. |
| 2006/0098440 A1 | 5/2006 | Allen |
| 2006/0146652 A1 | 7/2006 | Huizi et al. |
| 2006/0158130 A1 | 7/2006 | Furukawa |
| 2006/0202914 A1 | 9/2006 | Ashdown |
| 2006/0262544 A1 | 11/2006 | Piepgras et al. |
| 2006/0277823 A1 | 12/2006 | Barnett et al. |
| 2007/0032990 A1 | 2/2007 | Williams et al. |
| 2007/0096118 A1 | 5/2007 | Mahalingam et al. |
| 2007/0102033 A1 | 5/2007 | Petrocy |
| 2007/0159819 A1 | 7/2007 | Bayat et al. |
| 2007/0217093 A1 | 9/2007 | Xue et al. |
| 2007/0225933 A1 | 9/2007 | Shimomura |
| 2007/0247853 A1 | 10/2007 | Dorogi |
| 2007/0279921 A1 | 12/2007 | Alexander et al. |
| 2008/0018261 A1 | 1/2008 | Kastner |
| 2008/0025020 A1 | 1/2008 | Kolb |
| 2008/0043106 A1 | 2/2008 | Hassapis et al. |
| 2008/0130304 A1 | 6/2008 | Rash et al. |
| 2008/0232116 A1 | 9/2008 | Kim |
| 2008/0266839 A1 | 10/2008 | Claypool et al. |
| 2008/0271065 A1 | 10/2008 | Buonasera et al. |
| 2008/0291661 A1 | 11/2008 | Martin |
| 2009/0046151 A1 | 2/2009 | Nagaoka et al. |
| 2009/0058320 A1 | 3/2009 | Chou et al. |
| 2009/0153062 A1 | 6/2009 | Guo et al. |
| 2009/0160358 A1 | 6/2009 | Leiderman |
| 2009/0161356 A1 | 6/2009 | Negley et al. |
| 2009/0167203 A1 | 7/2009 | Dahlman et al. |
| 2009/0195162 A1 | 8/2009 | Maurer et al. |
| 2009/0195179 A1 | 8/2009 | Joseph et al. |
| 2009/0230883 A1 | 9/2009 | Haug |
| 2009/0235208 A1 | 9/2009 | Nakayama et al. |
| 2009/0261735 A1 | 10/2009 | Sibalich et al. |
| 2009/0268023 A1 | 10/2009 | Hsieh |
| 2009/0278474 A1 | 11/2009 | Reed et al. |
| 2009/0278479 A1 | 11/2009 | Plainer et al. |
| 2009/0284155 A1 | 11/2009 | Reed et al. |
| 2009/0309500 A1 | 12/2009 | Reisch |
| 2009/0315485 A1 | 12/2009 | Verfuerth et al. |
| 2010/0001652 A1 | 1/2010 | Damsleth |
| 2010/0052557 A1 | 3/2010 | Van et al. |
| 2010/0060130 A1 | 3/2010 | Li |
| 2010/0090577 A1 | 4/2010 | Reed et al. |
| 2010/0096460 A1 | 4/2010 | Carlson et al. |
| 2010/0123403 A1 | 5/2010 | Reed |
| 2010/0148677 A1 | 6/2010 | Melanson |
| 2010/0164406 A1 | 7/2010 | Kost et al. |
| 2010/0171442 A1 | 7/2010 | Draper et al. |
| 2010/0237711 A1 | 9/2010 | Parsons |
| 2010/0244708 A1 | 9/2010 | Cheung et al. |
| 2010/0246168 A1 | 9/2010 | Verfuerth et al. |
| 2010/0259193 A1 | 10/2010 | Umezawa et al. |
| 2010/0271802 A1 | 10/2010 | Recker et al. |
| 2010/0277082 A1 | 11/2010 | Reed et al. |
| 2010/0295454 A1 | 11/2010 | Reed |
| 2010/0295455 A1 | 11/2010 | Reed |
| 2010/0295946 A1 | 11/2010 | Reed et al. |
| 2010/0309310 A1 | 12/2010 | Albright |
| 2010/0328946 A1 | 12/2010 | Borkar et al. |
| 2011/0001626 A1 | 1/2011 | Yip et al. |
| 2011/0006703 A1 | 1/2011 | Wu et al. |
| 2011/0026264 A1 | 2/2011 | Reed et al. |
| 2011/0175518 A1 | 7/2011 | Reed et al. |
| 2011/0215724 A1 | 9/2011 | Chakravarty et al. |
| 2011/0215731 A1 | 9/2011 | Jeong et al. |
| 2011/0221346 A1 | 9/2011 | Lee et al. |
| 2011/0251751 A1 | 10/2011 | Knight |
| 2011/0282468 A1 | 11/2011 | Ashdown |
| 2011/0310605 A1 | 12/2011 | Renn et al. |
| 2012/0001566 A1 | 1/2012 | Josefowicz et al. |
| 2012/0019971 A1 | 1/2012 | Flaherty et al. |
| 2012/0038490 A1 | 2/2012 | Verfuerth |
| 2012/0098439 A1 | 4/2012 | Recker et al. |
| 2012/0119669 A1 | 5/2012 | Melanson et al. |
| 2012/0139426 A1* | 6/2012 | Ilyes .................. H05B 47/185 |
| | | 315/152 |
| 2012/0146518 A1 | 6/2012 | Keating et al. |
| 2012/0169053 A1 | 7/2012 | Tchoryk et al. |
| 2012/0169239 A1 | 7/2012 | Chen et al. |
| 2012/0181935 A1 | 7/2012 | Velazquez |
| 2012/0194054 A1 | 8/2012 | Johnston et al. |
| 2012/0206050 A1 | 8/2012 | Spero |
| 2012/0209755 A1 | 8/2012 | Verfuerth et al. |
| 2012/0221154 A1 | 8/2012 | Runge |
| 2012/0224363 A1 | 9/2012 | Van |
| 2012/0230584 A1 | 9/2012 | Kubo et al. |
| 2012/0242254 A1 | 9/2012 | Kim et al. |
| 2012/0286770 A1 | 11/2012 | Schroder et al. |
| 2012/0299492 A1 | 11/2012 | Egawa et al. |
| 2013/0033183 A1 | 2/2013 | Verfuerth et al. |
| 2013/0043792 A1 | 2/2013 | Reed |
| 2013/0049613 A1 | 2/2013 | Reed |
| 2013/0057158 A1 | 3/2013 | Josefowicz et al. |
| 2013/0126715 A1 | 5/2013 | Flaherty |
| 2013/0131882 A1 | 5/2013 | Verfuerth et al. |
| 2013/0141000 A1 | 6/2013 | Wei et al. |
| 2013/0141010 A1 | 6/2013 | Reed et al. |
| 2013/0163243 A1 | 6/2013 | Reed |
| 2013/0193857 A1 | 8/2013 | Tlachac et al. |
| 2013/0210252 A1* | 8/2013 | Ilyes .................. G01J 1/0407 |
| | | 439/226 |
| 2013/0229518 A1 | 9/2013 | Reed et al. |
| 2013/0235202 A1 | 9/2013 | Nagaoka et al. |
| 2013/0249429 A1 | 9/2013 | Woytowitz et al. |
| 2013/0307418 A1 | 11/2013 | Reed |
| 2013/0313982 A1 | 11/2013 | Reed |
| 2013/0340353 A1 | 12/2013 | Whiting et al. |
| 2014/0001961 A1 | 1/2014 | Anderson et al. |
| 2014/0028198 A1 | 1/2014 | Reed et al. |
| 2014/0028200 A1 | 1/2014 | Van Wagoner et al. |
| 2014/0055990 A1 | 2/2014 | Reed |
| 2014/0078308 A1 | 3/2014 | Verfuerth |
| 2014/0097759 A1 | 4/2014 | Verfuerth et al. |
| 2014/0128941 A1 | 5/2014 | Williams |
| 2014/0159585 A1 | 6/2014 | Reed |
| 2014/0166447 A1 | 6/2014 | Thea et al. |
| 2014/0225521 A1 | 8/2014 | Reed |
| 2014/0244044 A1 | 8/2014 | Davis et al. |
| 2014/0252961 A1 | 9/2014 | Ramer et al. |

(56) References Cited

U.S. PATENT DOCUMENTS

| | | | |
|---|---|---|---|
| 2014/0313719 A1 | 10/2014 | Wang et al. |
| 2014/0320027 A1 | 10/2014 | Reed |
| 2014/0359078 A1 | 12/2014 | Liu |
| 2015/0015716 A1 | 1/2015 | Reed et al. |
| 2015/0028693 A1 | 1/2015 | Reed |
| 2015/0069920 A1 | 3/2015 | Denteneer et al. |
| 2015/0077019 A1 | 3/2015 | Reed et al. |
| 2015/0084520 A1 | 3/2015 | Reed |
| 2015/0123563 A1 | 5/2015 | Dahlen |
| 2016/0021713 A1 | 1/2016 | Reed |
| 2016/0037605 A1 | 2/2016 | Reed et al. |
| 2016/0113084 A1* | 4/2016 | White | H05B 45/10 315/307 |
| 2016/0150622 A1 | 5/2016 | Flinsenberg et al. |
| 2016/0195434 A1 | 7/2016 | Roberts |
| 2016/0234899 A1 | 8/2016 | Reed et al. |
| 2016/0286623 A1 | 9/2016 | Reed |
| 2016/0323955 A1 | 11/2016 | Reed |
| 2017/0164439 A1 | 6/2017 | Reed |
| 2017/0311424 A1 | 10/2017 | Vendetti et al. |
| 2018/0035518 A1 | 2/2018 | Cook |
| 2018/0083438 A1 | 3/2018 | Reed |
| 2018/0083539 A1 | 3/2018 | Reed |
| 2018/0288860 A1 | 10/2018 | Vendetti et al. |
| 2018/0338367 A1 | 11/2018 | Reed |
| 2018/0352627 A1 | 12/2018 | Seki et al. |
| 2019/0394862 A1 | 12/2019 | Vendetti et al. |
| 2020/0029404 A1 | 1/2020 | Reed |
| 2020/0045794 A1 | 2/2020 | Reed et al. |

FOREIGN PATENT DOCUMENTS

| | | |
|---|---|---|
| EP | 1734795 A1 | 12/2006 |
| EP | 2320713 A2 | 5/2011 |
| EP | 2559937 A1 | 2/2013 |
| EP | 2629491 A1 | 8/2013 |
| EP | 1459600 B1 | 2/2014 |
| EP | 2781138 A | 9/2014 |
| FR | 2883306 A1 | 9/2006 |
| JP | 6-335241 A | 12/1994 |
| JP | 2001333420 A | 11/2001 |
| JP | 2004279668 A | 10/2004 |
| JP | 2004320024 A | 11/2004 |
| JP | 2004349065 A | 12/2004 |
| JP | 2005093171 A | 4/2005 |
| JP | 2005198238 A | 7/2005 |
| JP | 2005310997 A | 11/2005 |
| JP | 2006179672 A | 7/2006 |
| JP | 2006244711 A | 9/2006 |
| JP | 200859811 | 3/2008 |
| JP | 2008509538 | 3/2008 |
| JP | 2008130523 A | 6/2008 |
| JP | 2008159483 A | 7/2008 |
| JP | 2008177144 A | 7/2008 |
| JP | 2008535279 A | 8/2008 |
| JP | 2010504628 A | 2/2010 |
| KR | 20050078403 A | 8/2005 |
| KR | 20060086254 A | 7/2006 |
| KR | 20090042400 A | 4/2009 |
| KR | 100935736 B1 | 1/2010 |
| KR | 2020100007230 | 7/2010 |
| KR | 101001276 B1 | 12/2010 |
| KR | 101044224 B1 | 6/2011 |
| KR | 101150876 B1 | 5/2012 |
| WO | 02076068 A1 | 9/2002 |
| WO | 03/056882 A1 | 7/2003 |
| WO | 2005003625 A1 | 1/2005 |
| WO | 2006057866 A2 | 6/2006 |
| WO | 2007023454 A1 | 3/2007 |
| WO | 2007036873 A2 | 4/2007 |
| WO | 2008030450 A2 | 3/2008 |
| WO | 2008034242 A1 | 3/2008 |
| WO | 2009040703 A2 | 4/2009 |
| WO | 2010086757 A1 | 8/2010 |
| WO | 2010133719 A1 | 11/2010 |
| WO | 2011129309 A1 | 10/2011 |
| WO | 2012006710 A1 | 1/2012 |
| WO | 2012142115 A2 | 10/2012 |
| WO | 2013028834 A1 | 2/2013 |
| WO | 2013074900 A1 | 5/2013 |
| WO | 2014018773 A1 | 1/2014 |
| WO | 2014039683 A1 | 3/2014 |
| WO | 2014078854 A1 | 5/2014 |

OTHER PUBLICATIONS

"Lcd Backlight I/O Ports and Power Protection Circuit Design," dated May 2, 2011, retrieved Jun. 10, 2011, from http://www.chipoy.info/gadgets/lcd-backlight-i-o-ports-and-power-pr . . . , 4 pages.

EE Herald, "Devices to protect High brightness LED from ESD,"dated Mar. 16, 2009, retrieved Jun. 10, 2011, from http://www.eeherald.com/section/new-products/np100779.html, 1 page.

Fairchild Semiconductor, "LED Application Design Guide Using Half-Bridge LLC Resonant Converter for 100W Street Lighting, "AN-9729, Fairchild Semiconductor Corporation, Rev. 1.0.0, Mar. 22, 2011, 17 pages.

Huang, "Designing an LLC Resonant Half-Bridge Power Converter, "2010 Texas Instruments Power Supply Design Seminar, SEMI900, Topic 3, TI Literature No. SLUP263, Copyright 2010, 2011, Texas Instruments Incorporated, 28 pages.

Kadirvel et al., "Self-Powered, Ambient Light Sensor Using bq25504," Texas Instruments, Application Report, SLUA629—Jan. 2012, 6 pages.

Littelfuse, "Application Note: Protecting LEDs in Product Designs," 2009, 2 pages.

Panasonic Electronic Components, "LED Lighting Solutions," 2009, 6 pages.

Renesas Electronics, "Zener Diodes for Surge Absorption—Applications of high-intensity LED, "Apr. 2010, 1 page.

Tyco Electronics, "Circuit Protection," retrieved Jun. 10, 2011, retrieved from http://www.tycoelectronics.com/en/products/circuit-protection.html, 2 pages.

* cited by examiner

PHOTOCONTROLLER TO CONTROL OPERATION OF A LUMINAIRE HAVING A DIMMING LINE

CROSS-REFERENCE TO RELATED APPLICATION

This application claims benefit under 35 U.S.C. § 119(e) of U.S. Provisional Application No. 62/852,727, filed May 24, 2019, the entirety of which is incorporated by reference herein.

BACKGROUND OF THE INVENTION

Technical Field

The present application is directed to a photocontroller to control operation of a luminaire having a dimming line, for instance for use with street lights, lights in parking lots and other area lighting or luminaries.

Description of the Related Art

Conventional photocontrollers (commonly referred to as "photocontrols") typically have an electromechanical relay or solid-state switch which is activated in response to a signal produced by a light sensor, which switches the electromechanical relay or solid state switch to power a luminaire during hours of darkness. The resulting inrush current into the driver or ballast causes the relay contacts to have a relatively short lifetime. In the case of solid state switches, the forward drop of the solid state switch causes high power waste according to Ohms law, where a 1.5V forward voltage TRIAC would, for example, waste approximately 1.5 Watts during the On-time of a luminaire consuming 1 Ampere.

Many luminaires are now being built with a dimming standard which is known as 0 to 10V dimming. In particular this dimming standard includes "dim to off" capability, where a voltage of less than 1 Volt causes the luminaire to emit no light. A voltage of approximately 10 Volts on the input line causes the luminaire to emit light at full brightness.

A photocontrol socket under National Electrical Manufacturers Association (NEMA)/American National Standards Institute (ANSI) C136 standard (referred to herein as a "NEMA socket") for use with dimming drivers or ballasts has three contacts for power (Line, Neutral and Switched Line) plus at least two low power contacts for 0 to 10V dimming control. This type of socket has become very common because it allows for the attachment of a wireless control module to the luminaire. The wireless control module may have the capability of dimming the luminaire, and also returning status or asset control data to a centralized computer system.

A conventional photocontroller circuit may include a power supply connected to the power contacts of a NEMA socket and connected to provide power to light level detection circuitry. The power supply may include sets of resistors and a bridge rectifier formed of diodes and capacitors. Such components add to the complexity and cost of the photocontroller circuit.

BRIEF SUMMARY

In the above described situations, a less complex, less expensive photocontroller which does not include a power supply and which has an integrated design that does not incorporate a NEMA socket would be of great value. Furthermore, embodiments described herein may be used when no wireless control module is present, e.g., when a wireless control module has been omitted from a design to avoid its high cost when no wireless control functions are required and/or no network is available.

The long life of the photocontrol embodiments described herein advantageously matches the long life of solid state (LED) luminaires, thus it becomes much less likely that the luminaire will need to be serviced to replace a faulty photocontrol. The photocontrol embodiments described herein also advantageously have low power consumption, greatly reducing the "vampire" power waste of traditional photocontrols by a factor of, for example 100.

The photocontrol embodiments described herein advantageously employ the 0 to 10V dimming line as the luminaire control line, unlike some previous photocontrols which typically switch the power input to the luminaire.

A photocontroller to control operation of a luminaire having a dimming line may be summarized as including: a housing having an exterior and an interior; a set of dimming line leads, the dimming line leads accessible from an exterior of the housing; at least one light sensor, the at least one light sensor positioned and oriented to be responsive to a level of light in an environment external to the housing; and a set of circuitry housed by the housing, the set of circuitry comprising at least one transistor switch, the at least one transistor communicatively coupled to the at least one light sensor to receive an output thereof and responsive to the output of the at least one light sensor, the at least one transistor operably coupled to adjust a potential across the set of dimming line leads in response to the output of the at least one light sensor, the set of circuitry electrically coupling the set of dimming line leads without a power supply in the set of circuitry.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn, are not necessarily intended to convey any information regarding the actual shape of the particular elements, and have been solely selected for ease of recognition in the drawings.

DETAILED DESCRIPTION

Figure 1:
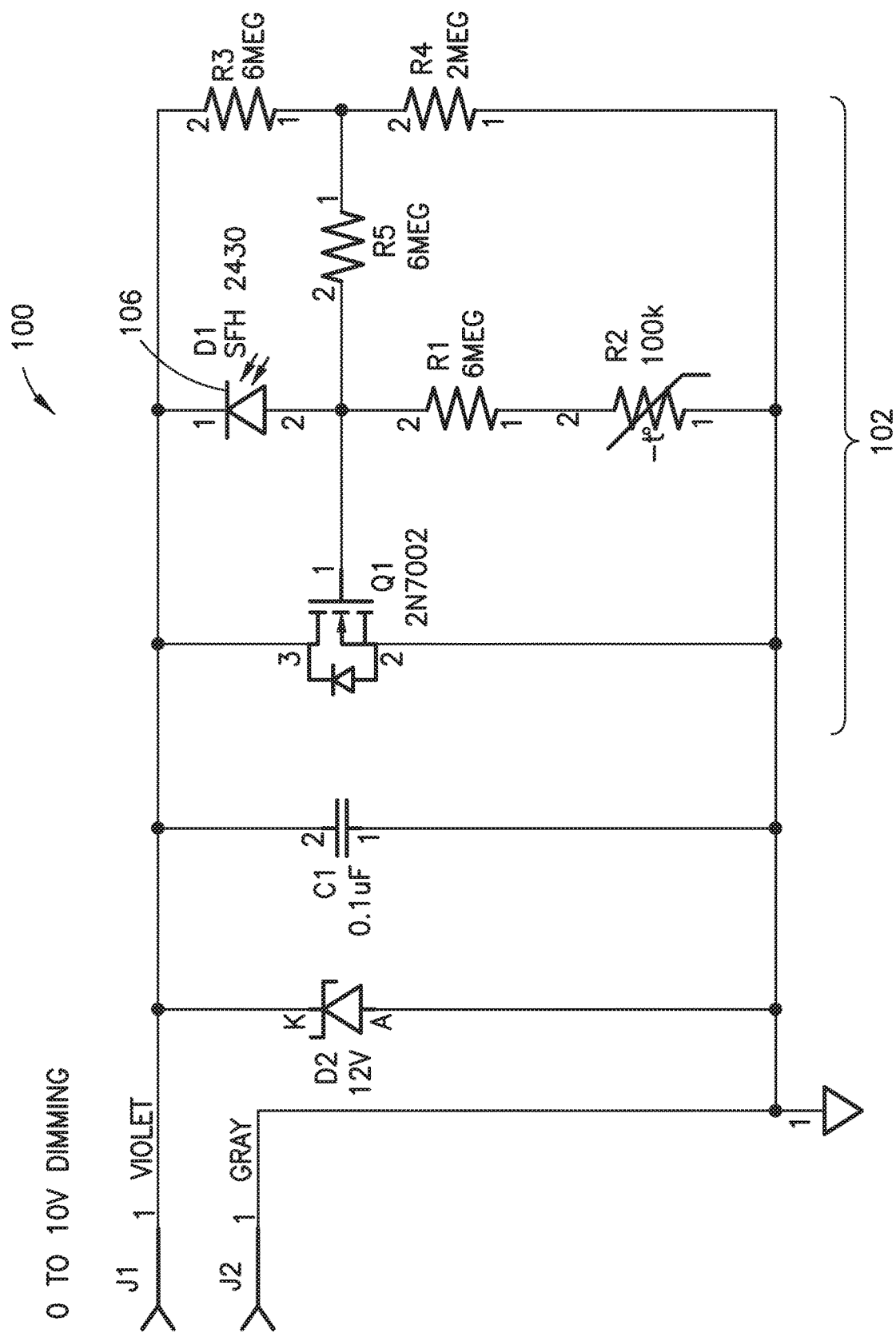
FIG. 1 is a schematic diagram of a photocontroller circuit having a set of light level detection circuitry which includes a light sensor, and that employs a 0 to 10V dimming line as a luminaire control line, according to at least one illustrated implementation.

FIG. 1 shows a photocontroller circuit 100, having a pair of terminals (J1, J2) to connect to a dimming control line of a luminaire, according to at least one illustrated implementation. For example, the terminals (J1, J2) may connect to a 0 to 10V dimming control line of ballast or a light emitting diode (LED) of a luminaire. The terminals (J1, J2) are each connected to one of a first and second voltage rail. In implementations, terminal J2 may be connected to a first voltage rail which is communicatively coupled to ground and terminal J1 may be connected to a second voltage rail which carries an operating voltage of the photocontroller circuit 100. A Zener diode D2 and a capacitor C1 are connected across the terminals (J1, J2), i.e., between the first and second voltage rails, to serve as a voltage regulator to keep the voltage between the terminals (J1, J2) at 10 V when the luminaire is controlled to the "on" condition.

The photocontroller circuit 100 includes a set of light level detection circuitry 102, which includes one or more light sensors 106 (e.g., photodiodes D1, charge coupled device(s), one or two dimensional image sensors) that detects when ambient light in an external environment is below a light level threshold, for example 1 foot candle. In implementations, the photodiode (D1) (for simplicity only one photodiode is discussed) may be a dual In-line (DIL), surface-mount technology (SMT) ambient light sensor, such as the SFH 2430 (e.g., from OSRAM Opto Semiconductors GmbH), which has a spectral sensitivity adapted to human eye sensitivity (i.e., a "VA characteristic"). The photodiode (D1) produces a current (i.e., "photocurrent") which is related to or represents the brightness (i.e., "illuminance") of the received ambient light.

The light sensor(s) 106 is communicatively (e.g., electrically) coupled to at least one transistor (Q1) and an arrangement of resistors, which may form an analog comparator. In implementations, the transistor (Q1) may be an N-Channel, enhancement-mode MOSFET, which is suited for low-power switching applications, such as, for example, an 2N7002 small-signal transistor (e.g., from Nexperia B.V.). The 2N7002 has a TO-236 package, also known as "small outline transistor" SOT-23 surface-mount, which is a commonly-used three-lead surface-mount package. In switching circuits, this type of transistor has particular advantages, such as a low threshold voltage (which means no gate bias is required) and high input impedance of the insulated gate (which means almost no gate current is required). Consequently, a current-limiting resistor may not be needed at the gate input.

In embodiments, the transistor (Q1) is arranged in the light level detection circuitry 102 so that its drain is communicatively coupled to the second voltage rail and its source is communicatively coupled to the first voltage rail (which is connected to ground in this implementation). In implementations, the light level detection circuitry 102 may be configured so that there is no resistor between the source of the transistor (Q1) and the first voltage rail and no resistor between the drain of the transistor (Q1) and the second voltage rail. The gate of the transistor (Q1) may be communicatively coupled to the anode of the photodiode (D1), and the cathode of the photodiode (D1) may be communicatively coupled to the second voltage rail.

The gate of the transistor (Q1) and the anode of the photodiode (D1) may be communicatively coupled to the first voltage rail (i.e., ground) through a series arrangement of a large resistor (R1) (e.g., 6 MΩ) and a smaller thermistor (R2) (e.g., 100 kΩ). In implementations, the thermistor may be a negative temperature coefficient device, which means that as temperature increases, the resistance of the thermistor decreases. The gate of the transistor (Q1) and the anode of the photodiode (D1) may be communicatively coupled, through a large resistor (R5) (e.g., 6 MΩ), to a junction of a set of resistors (R3, R4). The set of resistors, in the example depicted in FIG. 1, include a first resistor (R4) (e.g., 2 MΩ) connected between the junction of the pair of resistors (R3, R4) and the first voltage rail (i.e., ground) and a second resistor (R3) (e.g., 6 MΩ) connected between the junction of the pair of resistors (R3, R4) and the second voltage rail.

In implementations, the arrangement of the resistors (R1-R5) provides specific voltage values to bias the transistor (Q1) and the photodiode (D1). The arrangement of resistors (R1-R5) may also establish a light level threshold by providing a determined voltage, $V_{GS}$, at the gate of the transistor (Q1) relative to the source (which is tied to ground in this example). The determined voltage ($V_{GS}$) is, in effect, compared to a voltage, $V_{DS}$, at the drain of the transistor (Q1) (which is determined in part by the photocurrent produced by the photodiode, D1) to control the switching of the transistor (Q1). Thus, the photocurrent produced by the photodiode (D1), in conjunction with the light level threshold, controls the switching of the transistor (Q1). The switching of the transistor (Q1), in turn, controls the voltage at the terminals (J1, J2), which are connected to the dimming control line of the luminaire.

Alternatively, or additionally, the set of light level detection circuitry 102 may include one or more processors, for example a microcontroller or microprocessor with an analog or digital interface to the light sensor 106, and firmware processor-executable instructions or data stored on one or more nontransitory processor-readable media. Execution of the firmware processor-executable instructions or data by the microcontroller or microprocessor causes the microcontroller or microprocessor to determine if light detected in the ambient environment is above or below the light level threshold.

In response to a determination that light sensed in ambient environment is at or below the light level threshold (e.g., night time), an output of the set of light level detection circuitry 102 switches the 0 to 10V dimming input line to approximately 10V during nighttime, thereby controlling the luminaire to emit maximum light. In response to a determination that light sensed in ambient environment is above the light level threshold (e.g., day time), an output of the set of light level detection circuitry 102 switches the 0 to 10V dimming input line to less than approximately 1 Volt, thereby controlling the luminaire to emit minimum or no light.

Figure 2:
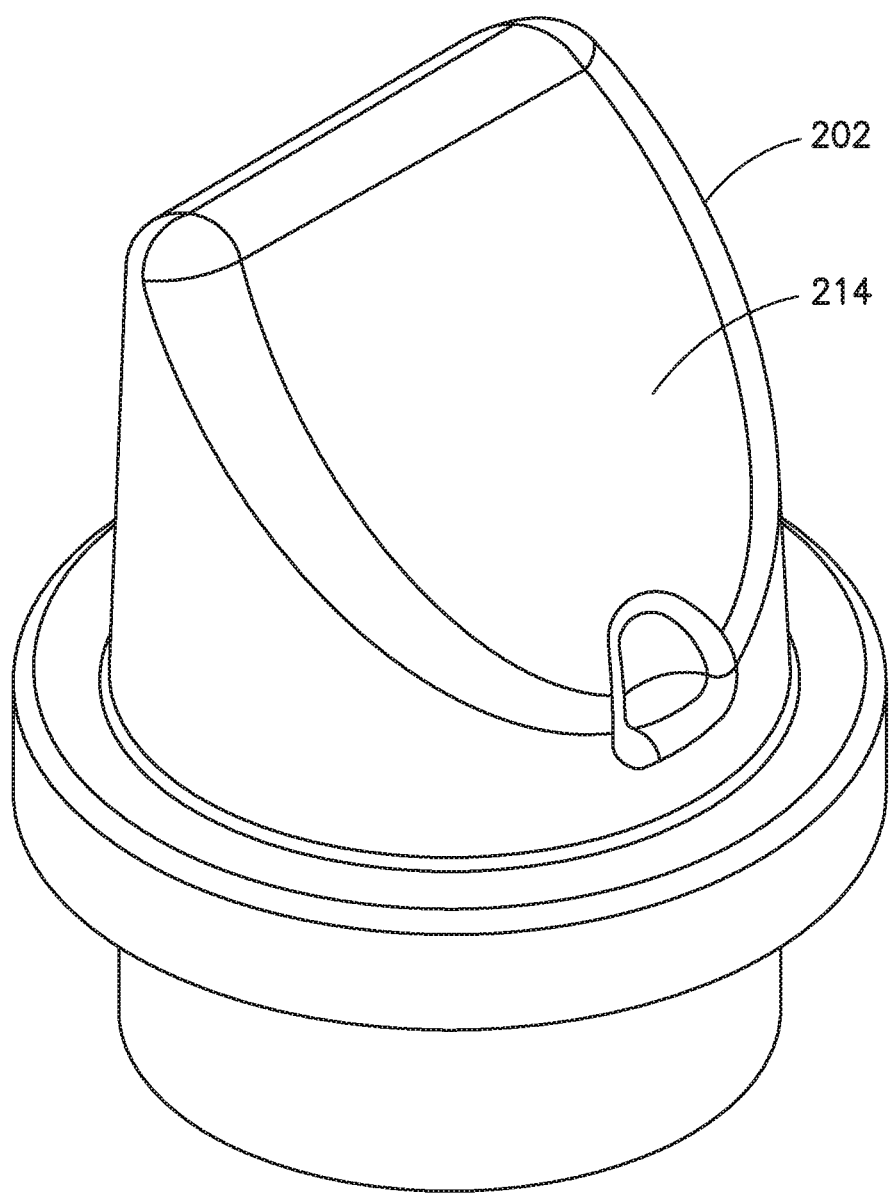
FIG. 2 is a side, front, top isometric view of a housing cover of a photocontroller, according to at least one illustrated implementation.

FIG. 2 is a side, front, top isometric view of a housing cover 202 of a photocontroller housing, according to at least one illustrated implementation. The housing cover 202 may be a clear plastic and may provide environmental protection for the PCB 210 (FIG. 3), as well as protect users from exposure to the circuitry 208 (FIG. 3) and possible electrical shock. The housing cover 202 may include one or more light directing features 214 (only one is depicted), for example molded into the housing 202. The light directing feature(s) 214 may be included so that the photocontroller is more sensitive in one direction than another. In implementations, the photocontroller and associated housing may employ structures and methods described in U.S. Pat. No. 9,924,582, issued Mar. 20, 2018 and U.S. Patent Application Publication No. 2018-0338367 A1, published Nov. 22, 2018, both of which are hereby incorporated by reference.

A rotatable socket may be installed in the luminaire so that the photocontroller can be rotated to a preferred direction, e.g., north. A secondary light direction element or coating may be inserted or applied to the housing cover 202 to block or channel ambient light to the photosensor to increase the directional response of the photocontroller. The housing cover 202 is communicatively coupled, e.g., mechanically attached, to the housing base 204, as discussed below, to protect the circuitry 208 from water or foreign matter ingress. The housing cover 202 may be infused with UV protecting chemicals such as the Omnifusion™ process.

Figure 3:
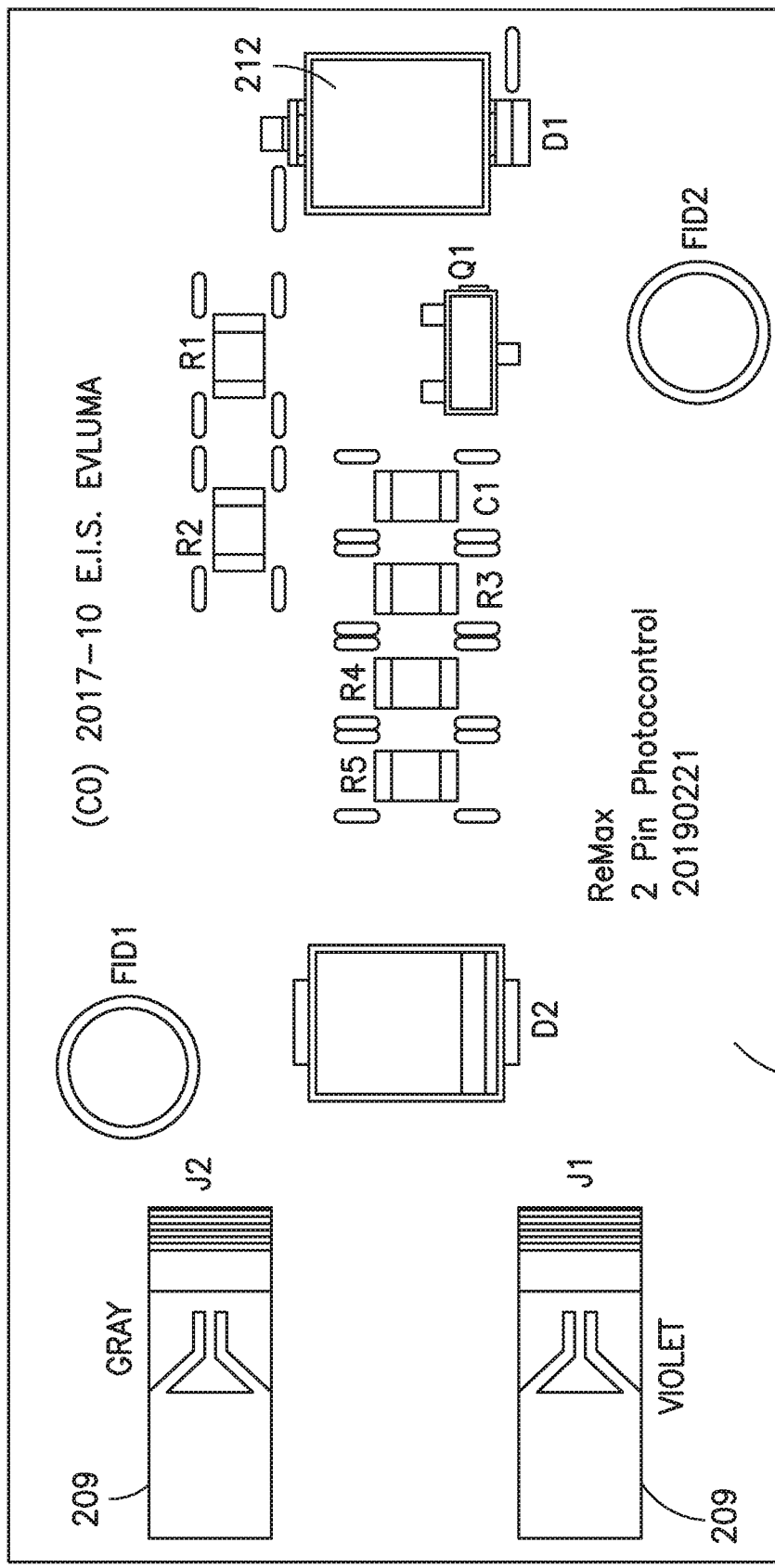
FIG. 3 an isometric view that illustrates a set of photocontroller circuitry to be housed by the housing of the photocontroller, the photocontroller circuitry including a printed circuit board (PCB) in the illustrated implementation.

FIG. 3 illustrates a set of photocontroller circuitry 208 to be housed by the housing cover 202 and housing base 204 of the photocontroller. The set of photocontroller circuitry 208 may be similar or even identical to the set of photocontroller circuit 100 (FIG. 1). In implementations, the photocontroller may include a printed circuit board (PCB) 210 which includes one or more electrically insulative layers and one or more electrically conductive traces, and which carries some or all of the circuitry. In some implementations, the photocontrol module 200 may advantageously include a single PCB 210. The PCB 210 may include a number of surface mount devices (SMD) or surface mount components 212, e.g., for all of the electrical components represented in the schematic diagram of FIG. 1. The PCB 210 may have one or more conductive traces (not shown), the conductive traces or components soldered directly to a set of connectors 209, e.g., wire-to-board crimp or poke-in connectors, which correspond to the pair of terminals (J1, J2) to connect to a dimming control line of a luminaire, as discussed above with respect to FIG. 1.

Figure 4:
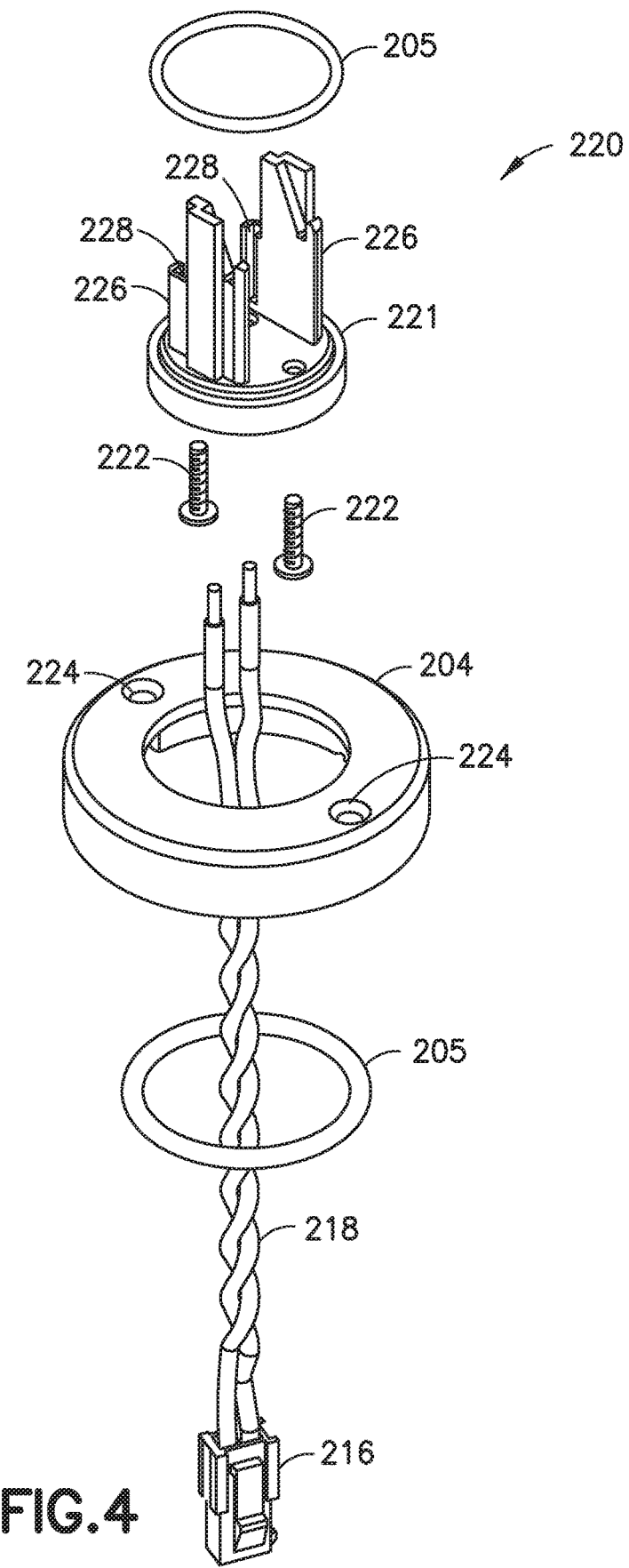
FIG. 4 is an exploded isometric view of the photocontroller, apart from the housing cover and photocontroller circuitry, the photocontroller including a dimming control line connector and lead wires, a housing base, and a photocontroller circuitry PCB mount.

FIG. 4 is an exploded isometric view of the photocontroller, apart from the housing cover 202 and photocontroller circuitry 208, the photocontroller including a dimming control line connector 216 and lead wires 218, a housing base 204, gaskets 205, and a photocontroller circuitry PCB mount 220. The housing base 204 may be formed of various materials, e.g., plastic or metal, and may be ring-shaped with a central opening to allow the dimming control lead wires 218 to reach the PCB mount 220 (to be communicatively coupled with the set of connectors 209 of the PCB 210). The PCB mount 220 may be formed of, e.g., plastic, and may have a disk-shaped portion 221 having holes through which the dimming control lead wires 218 can pass to reach the photo controller circuitry 208 on the PCB 210. The PCB mount 220 may attach to the housing base 204 with fasteners 222 inserted through holes 224 formed in a flat ring-shaped portion. The PCB mount 220 may include extending supports 226 having slots 228 or other attachment features for securing the PCB 210. The PCB 210, when mounted in the PCB mount 220, may be oriented such that a plane of the PCB 210 is perpendicular to a plane of the disk-shaped portion 221 of the PCB mount 220. The housing base 204 may include NEMA twist-lock male contacts arranged such that the contacts may be inserted into a NEMA five-contact receptacle or a NEMA seven-contact receptacle.

The housing cover 202, e.g., as shown in FIG. 2, may have a lower portion which is adapted to receive the housing base 204 to achieve, e.g., a pressure, snap, or threaded fit (alternatively, or in addition, fasteners may be used to secure the housing cover to the housing base). When the housing cover 202 is in place when the housing base, the PCB 210 is positioned in an interior portion of the housing cover 202 such that the set of photocontroller circuitry 208, in particular the set of light level detection circuitry 102, is aligned with one or more light directing features 214 and/or other transparent/translucent portions of the housing cover 202.

While the PCB 210 is described above as having a set of connectors 209 to which lead wires 218 may be physically and electrically coupled, in some implementations the lead wires 218 may be directly attached (e.g., soldered) to circuit traces or pads on the PCB 210.

The various embodiments described above can be combined and/or modified to provide further embodiments in light of the above-detailed description, including the material incorporated by reference. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A photocontroller to control operation of a luminaire having a dimming line, the photocontroller comprising:
   a housing having an exterior and an interior;
   a set of dimming line leads, the dimming line leads accessible from the exterior of the housing;
   at least one light sensor, the at least one light sensor positioned and oriented to be responsive to a level of light in an environment external to the housing; and
   a set of circuitry housed by the housing, the set of circuitry comprising at least one transistor, the at least one transistor communicatively coupled to the at least one light sensor to receive an output thereof and responsive to the output of the at least one light sensor, the at least one transistor operably coupled to adjust a potential across the set of dimming line leads in response to the output of the at least one light sensor, the set of circuitry electrically coupling the set of dimming line leads without a power supply in the set of circuitry, wherein the set of circuitry includes a first voltage rail and a second voltage rail, and the at least one transistor is electrically coupled across the first and the second voltage rails.

2. The photocontroller of claim 1 wherein, when the set of dimming line leads of the photocontroller are electrically coupled to a dimming line of a luminaire, the at least one transistor is operable to control operation of the luminaire without the photocontroller switching a power input to the luminaire itself.

3. The photocontroller of claim 1 wherein the set of dimming line leads are electrically coupled to a 0V and 10V dimming line of one of a ballast or an light emitting diode driver of a luminaire.

4. The photocontroller of claim 3 wherein the at least one transistor is operable to a vary the potential across the set of dimming line leads between approximately 0V and approximately 10V.

5. The photocontroller of claim 1 wherein the first voltage rail is coupled to a ground.

6. The photocontroller of claim 5 wherein the set of circuitry includes at least a first resistor, and the at least one light sensor and at least the first resistor are electrically coupled in series with one another across the first and the second voltage rails, and electrically coupled to apply a potential to a gate of the at least one transistor.

7. The photocontroller of claim 5 wherein the set of circuitry includes a Zener diode and capacitor electrically coupled in parallel with one another across the first and the second voltage rails.

8. The photocontroller of claim 1 wherein the housing comprises a base and a cover, the cover physically coupleable to the base, the housing which houses a set of light level detection circuitry and a low power consumption power supply.

9. The photocontroller of claim 1 wherein the housing is at least partially transparent.

10. The photocontroller of claim 1 wherein the housing includes at least one light directing feature to define an optical path to the at least one light sensor from an exterior of the housing.

11. The photocontroller of claim 1 wherein the set of dimming line leads comprises a pair of wires that extend outwardly from the housing.

12. The photocontroller of claim 1 wherein the housing has a base with NEMA twist-lock male contacts arranged such that the NEMA twist-lock male contacts may be inserted into a NEMA five-contact receptacle or a NEMA seven-contact receptacle.

13. A method of operation in a photocontroller, the method comprising:
   sensing light in an ambient environment by at least one light sensor;
   applying a signal representative of the sensed light to a gate of a transistor, the transistor electrically coupled across a pair of dimming line leads;
   adjusting a dimming line signal supplied via the pair of dimming line leads by the transistor in response to the signal representative of the sensed light to supply the dimming line signal to a ballast or light emitting diode driver of a luminaire without a power supply in the photocontroller.

14. The method of claim 13 wherein adjusting a dimming line signal includes adjusting a potential across the pair of dimming line leads by the transistor in response to the signal representative of the sensed light.

15. The method of claim 14 wherein adjusting a potential across the pair of dimming line leads by the transistor in response to the signal representative of the sensed light includes adjusting a potential to between approximately 0V and approximately 10V.

16. The method of claim 15 wherein adjusting a potential to between approximately 0V and approximately 10V includes adjusting the potential to less than 1 Volt.

17. The method of claim 13 wherein adjusting a potential to between approximately 0V and approximately 10V includes electrically shorting the pair of dimming line leads together.

* * * * *